United States Patent
Prabhakar et al.

(10) Patent No.: US 11,464,073 B2
(45) Date of Patent: Oct. 4, 2022

(54) AUTOMATIC DEPLOYMENT OF WIRELESS OR WIRED NETWORKS THROUGH CLUSTERING OF GATEWAYS AND TUNNELING OF DATA TRAFFIC TO THE GATEWAYS

(71) Applicant: HEWLETT PACKARD ENTERPRISE DEVELOPMENT LP, Houston, TX (US)

(72) Inventors: Raghunandan Prabhakar, Bangalore (IN); Piyush Agarwal, Santa Clara, CA (US); Senthil Kumar Veeraswamy Santhanam, Santa Clara, CA (US); Shravan Kumar Vuggrala, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

(21) Appl. No.: 17/173,965

(22) Filed: Feb. 11, 2021

(65) Prior Publication Data
US 2022/0256646 A1 Aug. 11, 2022

(51) Int. Cl.
| H04W 4/00 | (2018.01) |
| H04W 84/18 | (2009.01) |
| H04W 72/08 | (2009.01) |
| H04W 72/02 | (2009.01) |

(52) U.S. Cl.
CPC ........... *H04W 84/18* (2013.01); *H04W 72/02* (2013.01); *H04W 72/08* (2013.01)

(58) Field of Classification Search
CPC ..... H04W 84/18; H04W 72/02; H04W 72/08; H04W 28/04; H04W 72/04; H04W 72/042; H04W 88/08; H04L 5/0007
See application file for complete search history.

(56) References Cited

U.S. PATENT DOCUMENTS

| 8,559,447 | B2 | 10/2013 | Jetcheva et al. | |
| 9,451,466 | B2* | 9/2016 | Valliappan | H04W 16/02 |
| 10,880,030 | B2* | 12/2020 | Park | H04W 24/08 |
| 11,140,695 | B1* | 10/2021 | Eyuboglu | H04W 72/1257 |
| 2007/0201417 | A1* | 8/2007 | Malik | H04W 84/12 370/338 |
| 2008/0013474 | A1* | 1/2008 | Nagarajan | H04L 12/4633 370/321 |
| 2009/0132675 | A1* | 5/2009 | Horn | H04W 76/18 709/227 |

(Continued)

OTHER PUBLICATIONS

Aruba, "SD-Branch for Midsize Networks," Design and Deployment Guide, Mar. 2019, 153 pages, https://docplayer.net/137333663-Sd-branch-for-midsize-networks.html.

(Continued)

*Primary Examiner* — Phuongchau Ba Nguyen
(74) *Attorney, Agent, or Firm* — Sheppard Mullin Richter & Hampton LLP

(57) ABSTRACT

Systems and methods are provided for receiving an indication that controllers and network devices belong to a site of a network, detecting the controllers and the network devices at the site, clustering the controllers to be deployed in the network, mapping the network devices to the controllers, and tunneling traffic from client devices accessing the network through the network devices to one of the controllers.

16 Claims, 8 Drawing Sheets

(56) References Cited

U.S. PATENT DOCUMENTS

| | | | |
|---|---|---|---|
| 2011/0142048 A1* | 6/2011 | Yoon | H04W 72/02 |
| | | | 370/392 |
| 2012/0224566 A1* | 9/2012 | O'Leary | H04W 28/04 |
| | | | 370/338 |
| 2020/0304378 A1 | 9/2020 | Choi et al. | |
| 2020/0351182 A1 | 11/2020 | Hegde et al. | |

OTHER PUBLICATIONS

Riverbed Technology, Inc., "SD-WAN Deployment Guide," SteelConnect 2.10, Apr. 2018, 160 pages, https://support.riverbed.com/bin/support/download?did=htb90kutvupg3mrmv10va5957u.

* cited by examiner

AUTOMATIC DEPLOYMENT OF WIRELESS OR WIRED NETWORKS THROUGH CLUSTERING OF GATEWAYS AND TUNNELING OF DATA TRAFFIC TO THE GATEWAYS

BACKGROUND

A network may be connected by interconnected network devices (access points, switches, etc.) and controllers. For a network to be deployed, these controllers and network devices must be accurately provisioned and configured.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
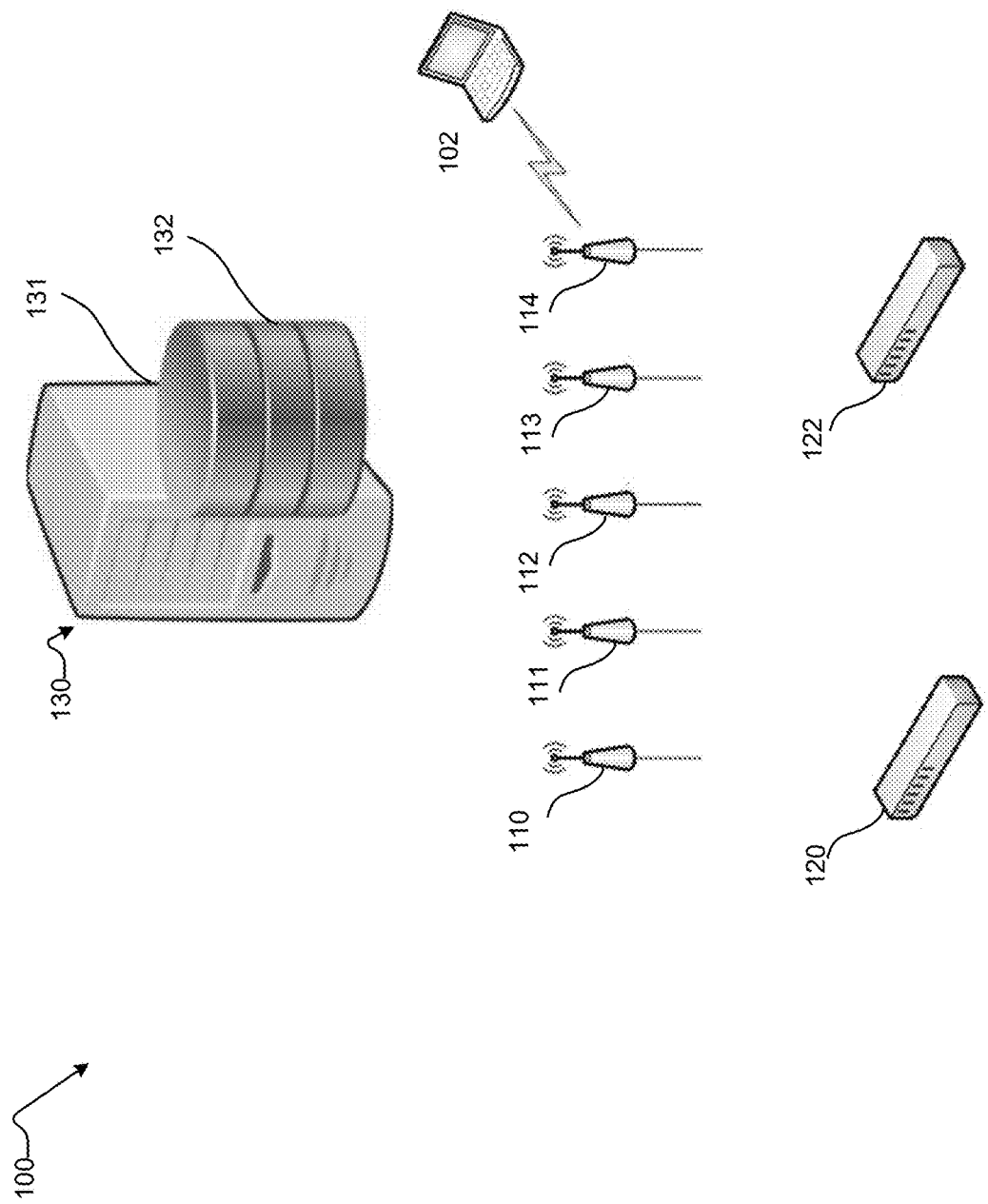
FIG. 1A is an exemplary illustration of a computing system that automatically deploys a network using ZTP (Zero Touch Provisioning), according to embodiments described in the present disclosure.

The figures are not exhaustive and do not limit the present disclosure to the precise form disclosed.

DETAILED DESCRIPTION

The skyrocketing demand of data access has brought along an increased need to rapidly and conveniently deploy wired and wireless networks including Local Area Networks (LAN), Wireless Local Area Networks (WLAN), Wide-Area Networks (WAN), Enterprise, SD (Software-Defined)-WAN, SD-Branch, or Retail networks.

Currently, the deployment of networks may be slowed down due to manual requirements of inputting configurations and settings of controllers and network devices.

Specifically, current problems of network deployment include a need to manually input configurations and settings of controllers and network devices one-by-one in order to map the controllers to a given deployment site and set up transmission and reception of data to and from a client device at an access point to a specific controller. As a result, not only may deployment be slowed down, but errors may also arise during the manual process.

Embodiments described herein address these technical problems by creating clusters of controllers or gateways (hereinafter "controllers") at a site, mapping network devices including, for example, access points and/or switches, to the controllers, and tunneling data from the access points and/or switches to a specific controller, using Zero Touch Provisioning (ZTP). ZTP enables the deployment of a network via configuring the controllers and the network devices with no or minimal manual intervention. In particular, ZTP obviates the need to manually input that each of the network devices belongs a given network, each of the controllers belongs to that given network, and that traffic is to be routed from the network devices to any of the controllers. Moreover, ZTP obviates the need to manually download and/or install particular settings or configurations onto the network devices, such as software or firmware that include operation settings and/or protocols, and security features. In some embodiments, a remote server, such as a cloud server may create the clusters and tunnel data from access points to the clusters. The creation of clusters of controllers may include receiving an indication that controllers are to be added to a site of a network, detecting an existence of the controllers, and adding the controllers to the site. The indication may be from a user labelling, tagging, or otherwise indicating that the controllers belong to the site. Furthermore, the remote server may receive an indication that access points and/or switches belong to a site. Using or based on the indications, the remote server may detect the controllers and the access points and/or switches at the site, cluster the controllers to be deployed in the network, and map the access points and/or the switches to the controllers. The remote server may tunnel or divert data from an access point and/or switch to a controller. In some embodiments, the tunneling process may include diverting data from access points and/or switches to controllers based on a balancing of loads at both the access points and/or switches and the controllers of the site. Accordingly, these access points and/or switches may be considered to be automatically clustered, mapped, and tunneled as no manual input from a user is required other than initial indications that controllers and access points and/or switches belong to a common site. The deployment may enable both WAN (wide-area network) and LAN (local area network) features at that site.

FIG. 1A is an exemplary illustration of an environment 100 including a computing system 130 that performs automatic deployment by detecting access points and/or switches and controllers, clustering all controllers that belong to a given site, and tunneling data traffic from the access points to the controllers. The environment 100 includes access points 110, 111, 112, 113, and 114, a client device 102 that transmits and receives data from one or more of the access points 110, 111, 112, 113, and 114, and controllers 120 and 122. Although access points are shown for purposes of simplicity, at least some of the access points may be replaced by switches. More than one controller is available to provide redundancy, so if one controller fails, then one or more of the other controllers may prevent loss of data transmission or otherwise compromised functioning of the network. In addition, if one controller is undergoing maintenance or an upgrade, data traffic may be tunneled to the other controller or controllers in the meantime to avoid a slowdown.

The computing system 130 may include a computing component 131 and a database 132. The computing system 130 may include a remote server so that the automatic deployment may be offloaded from the access points or the controllers, thus reducing the respective loads of the access points and the controllers. Additionally, components of the computing system 130, unlike an operating system of the access points 110, 111, 112, 113, and 114, may be easily updated or modified at any time, thus improving an efficiency and efficacy of the deployment.

Figure 1B:
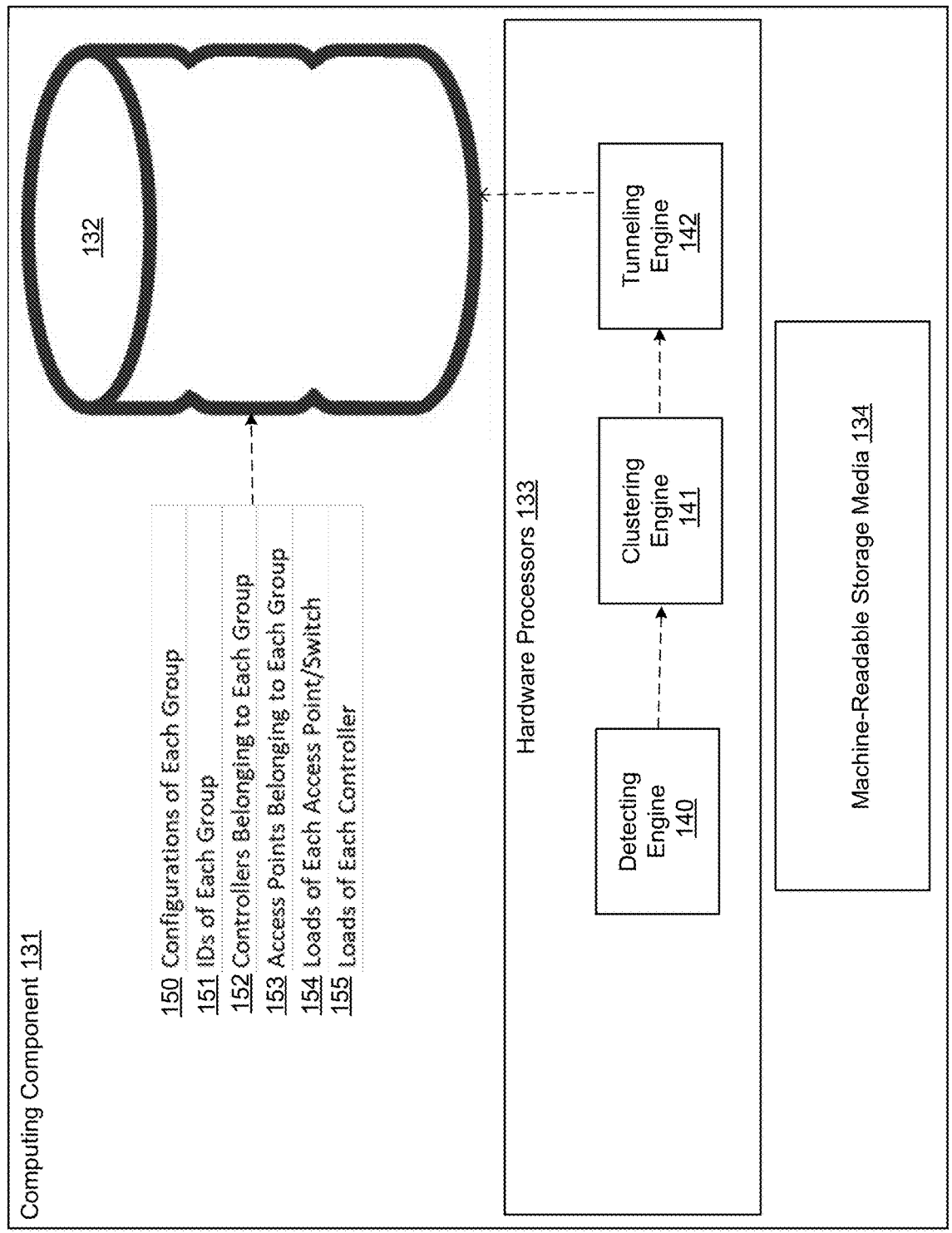
FIG. 1B is an exemplary illustration of a computing component within the computing system of FIG. 1A that automatically deploys a network, according to embodiments described in the present disclosure.

As shown in FIG. 1B, the computing component 131 may include a detecting engine 140, a clustering engine 141, and a tunneling engine 142. The detecting engine 140 may receive an indication that particular controllers (e.g., controllers 120 and 122) and network devices (e.g., access points 110, 111, 112, 113, and 114) are to be added to a site when configuring the network. The detecting engine 140 may also detect the particular controllers and the access points 110, 111, 112, 113, and 114. For example, the detection may be done via detection of IDs (e.g., BSSIDs (Basic Service Set Identifiers) or MAC (media access control) addresses) of the access points. In some embodiments, the controllers 120 and 122 may be stationary. In other embodiments, the controllers may be mobile. If the controllers 120 and 122 are mobile, the detecting engine 140 may receive an indication that a controller has moved out of a site or moved into a site and remove or add the controller from the cluster.

The clustering engine 141 may cluster the controllers 120 and 122 to the site, and overlay, or map, the access points 110, 111, 112, 113, and 114 to the controllers 120 and 122 at the site. The clustering engine 141 may send to, and/or install onto, each of the access points 110, 111, 112, 113, and 114, an image including required software or firmware, along with configuration information. In some examples, the image and/or the configuration information, which may be specific for each of the access points 110, 111, 112, 113, and 114, may be stored in the database 132. The image and configuration information may be required in order for the access points 110, 111, 112, 113, and 114 to be connected and deployed at a network of the site. The configuration file may be in a format of a configuration file and/or a script. The clustering engine 141 may first install the image onto each of the access points 110, 111, 112, 113, and 114 and subsequently apply the configuration information specified in the configuration file and/or execute the script. In some examples, the clustering engine 141 may also transmit operating system updates, patches and bug fixes, security features such as firewall or encryption settings, and other features to any or all of the access points 110, 111, 112, 113, and 114. For example, the encryption settings may include protocols consistent with the WEP (Wired Equivalent Privacy) standard, WPA (WiFi Protected Access) standard, or the EAP (Extensible Authentication Protocol). The clustering engine 141 may receive a confirmation that the access points 110, 111, 112, 113, and 114 have the image successfully installed and the configuration information properly applied. The clustering engine 141 may assign a SSID (Service Set Identifier) of the network to the controllers 120 and 122, and the access points 110, 111, 112, 113, and 114, so that the controllers 120 and 122, and the access points 110, 111, 112, 113, and 114 are associated with a common network. The clustering engine 141 may further record data of the aforementioned process in a log, including start and end times of installation of the image and application of the configuration information, particular interfaces used to transmit the image and the configuration information, filenames of the configuration information and the image files, specific locations of the configuration information and the image files, and protocols used to retrieve the configuration information and the image files. In such a manner, a user does not need to manually download the image, configuration information, and other settings required for each of the access points 110, 111, 112, 113, and 114.

Next, the tunneling engine 142 may set up tunnels, or communication channels, between each of the mapped access points 110, 111, 112, 113, and 114 and the clustered controllers 120 and 122. Thus, each of the clustered access points 110, 111, 112, 113, and 114 may be mapped to each of the clustered controllers. The mapping may include mapping a SSID identifying the network to each of the access points 110, 111, 112, 113, and 114, as well as to the clustered controllers 120 and 122. In some embodiments, the SSID may have been previously set by a user. The SSID may be broadcasted by each of the access points 110, 111, 112, 113, and 114 to client devices attempting to connect to the network. If the network is a wired network, switch ports of switches in the wired network may be mapped to the clustered controllers 120 and 122. The tunnels may include, without exception, any tunnel that provides L2 encapsulation for the data traffic, including a GRE (Generic Route Encapsulation) or a VxLAN (Virtual Extensible Local Area Network) to transmit multicast, broadcast, or non-IP data packets, or an IPSec (Internet Protocol Security) tunnel to transmit unicast data packets. In such a manner, each of the access points 110, 111, 112, 113, and 114, or alternatively, the switches, may have communication channels to each of the clustered controllers 120 and 122. During data transmission, data from one of the access points 110, 111, 112, 113, and 114 may be tunneled to one of the clustered controllers 120 and 122 based on criteria including, but not limited to, loads of each of the access points 110, 111, 112, 113, and 114 and loads of each of the clustered controllers 120 and 122. In some examples, loads may include amounts of traffic or traffic throughputs at each of the access points 110, 111, 112, 113, and 114, and at each of the clustered controllers 120 and 122. The amounts of traffic may be defined in absolute terms or relative to a capacity of each of the access points 110, 111, 112, 113, and 114, and each of the clustered controllers 120 and 122. The tunneling engine 142 further facilitates encryption of data in transit by distributing cryptographic keys to the access points 110, 111, 112, 113, and 114 and the clustered controllers 120 and 122. In such a manner, data in transit may be encrypted in order to maintain data security.

Meanwhile, in FIG. 1B, the database 132 may store data, such as log data, acquired by any of the detecting engine 140, the clustering engine 141, and the tunneling engine 142. The data may include configurations 150 of each site or group. A group may include deployments of controllers and access points from different sites that share the same network address, such as a SSID (Service Set Identifier) broadcasted by the access point, and/or network configuration properties, as will be shown in FIGS. 2 and 3. Sites may refer to locations or branches of a network deployment. However, different sites within the same group are nonetheless separated or isolated from one another. In particular, an access point belonging to one site cannot be tunneled to a controller belonging to a different site, even if the access point and the controller belong to a common group, such as in a scenario of a branch deployment. The data may further include, network addresses 151 of each site or group, controllers 152 belonging to each site or group, access points 153 belonging to each site or group, loads of each access point 154, and loads of each controller 155. Data in the database 132 may be used to maintain settings of a network at a site and/or group, and to dynamically balance data traffic between among the access points and the controllers.

Figure 2:
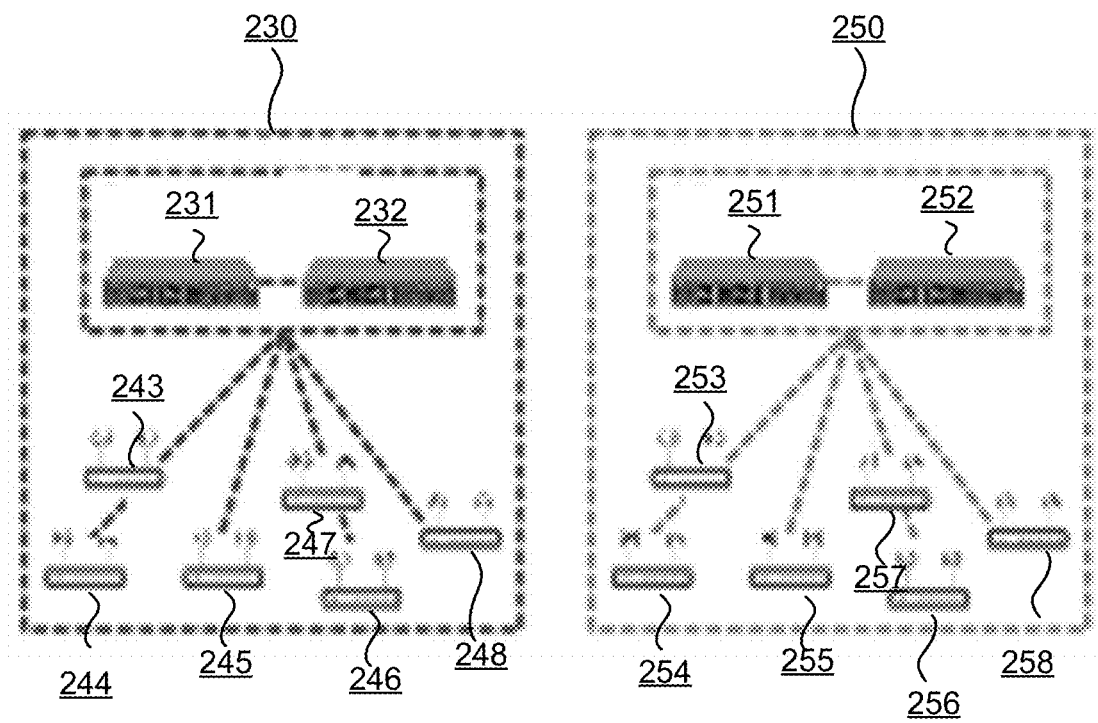
FIG. 2 is an exemplary illustration of a network including different sites within a common group, in accordance with the embodiments described in the present disclosure.

FIG. 2 illustrates an implementation of a wireless or wired network at different sites 230 and 250 which may be deployed following the process as described above with respect to FIGS. 1A and 1B.

The network at a first site 230 may include controllers 231 and 232, and access points 243, 244, 245, 246, 247, and 248. Any number of controllers and access points may be implemented at the first site 230, although, preferably, at least two controllers should be implemented at the second site 250 for redundancy. The controllers 231 and 232 may be implemented as any of the controllers 120 and 122 as illustrated in FIG. 1A, while the access points 243, 244, 245, 246, 247, and 248 may be implemented as any of the access points 110, 111, 112, 113, and 114 as illustrated in FIG. 1A. At the first site 230, the access point 243 may be mapped to the controllers 231 and 232. Thus, data from the access point 243 may be tunneled to either of the controllers 231 or 232 depending on load balancing considerations, but a given data packet transmitted through the access point 243 is tunneled to only one of the controllers 231 or 232. In particular, tunnels or communication channels from the access point 243 to both of the controllers 231 and 232 may enable a given data packet to be transmitted or tunneled from the access point 243 to either of the controllers 231 or 232. However, if a given data packet is being tunneled from the access point 243 to the controller 231, then that given data packet would not also be tunneled to the controller 232 to avoid duplicate processing. Determining whether a given data packet is being tunneled to the controller 231 or the controller 232 may depend on which controller is experiencing a smaller amount of traffic throughput, either in absolute terms or relative terms adjusted for capacities of the controllers 231 and 232. For example, if the controller 231 has a smaller traffic throughput compared to the controller 232, then the given data packet may be tunneled to the controller 231 instead of the controller 232. In another example, if a traffic throughput at the controller 231 is 40% of its capacity and a traffic throughput at the controller 232 is 50% of its capacity, then the given data packet may be tunneled to the controller 231 instead of the controller 232. Thus, a given data packet may be tunneled to a controller that has a lower or lowest traffic throughput relative to its capacity. Likewise, tunnels may be established between each of the access points 244, 245, 246, 247, and 248, and the controllers 231 and 232, in a manner similar or same to that as described above. Access points and/or controllers may be added or removed from the first site 230, and tunneling among the remaining or new access points and/or controllers may be reestablished.

Meanwhile, a network at the second site 250 may include controllers 251 and 252, along with access points 253, 254, 255, 256, 257, and 258. The first site 230 and the second site 250 may have a common network configuration and/or network ID such as a SSID, but the access points 243, 244, 245, 246, 247, and 248 at the first site 230 may be isolated from the controllers 251 and 252 at the second site 250, meaning that data from the access points 243, 244, 245, 246, 247, and 248 may not be tunneled to the controllers 251 and 252. Similarly, the access points 253, 254, 255, 256, 257, and 258 of the second site may be isolated from the controllers 231 and 232 at the first site 230. Such an arrangement may be part of a branch deployment or a Distributed Enterprise deployment, or resemble a branch deployment or a Distributed Enterprise deployment. Thus, the computing component 131 may deploy networks in a versatile manner by partitioning different sites among a common group, such that access points in the first site 230 cannot access controllers in the second site 250, and access points in the second site 250 cannot access controllers in the first site 230.

Figure 3:
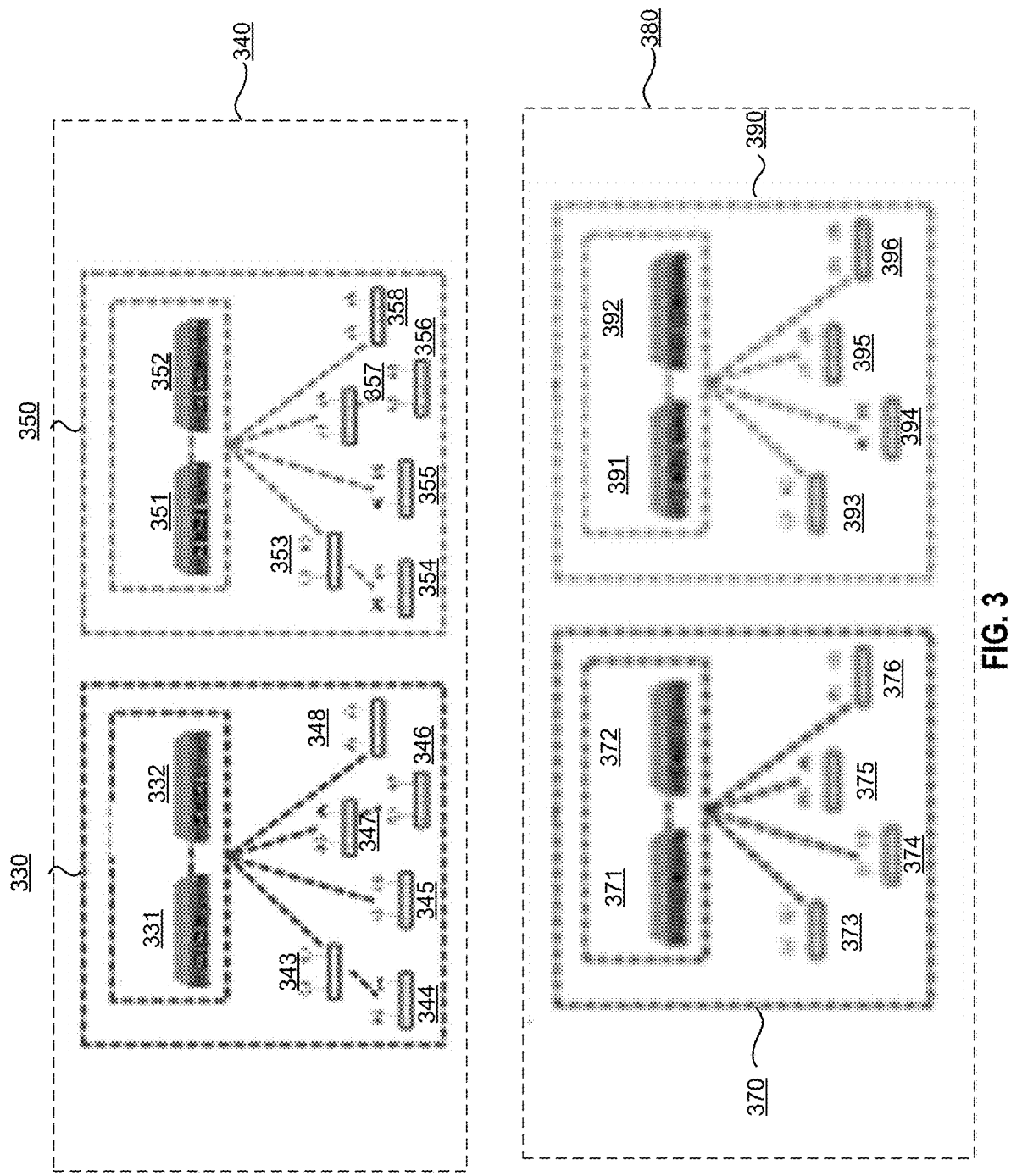
FIG. 3 is an exemplary illustration of a network including different sites within a common group and different sites from different groups, in accordance with the embodiments described in the present disclosure.

FIG. 3 is an exemplary illustration of a network including different sites within a common group and different sites from different groups, in accordance with the embodiments described in the present disclosure.

In FIG. 3, a first site 330 and a second site 350 belong to a first group 340, meaning that they share a first common network configuration and/or a first network ID such as a SSID, while a third site 370 and a fourth site 390 belong to a second group 380, meaning that they share a second (e.g., different from the first common network configuration) common network configuration and/or a second network ID. Thus, the first site 330 and the second site 350 form the first common group 340, while the third site 370 and the fourth site 390 form the second common group 380.

In FIG. 3, a network at the first site 330 may include controllers 331 and 332, and access points 343, 344, 345, 346, 347, and 348. Any number of controllers and access points may be implemented at the first site 330, although, preferably, at least two controllers should be implemented at the first site 330 for redundancy purposes. The controllers 331 and 332 may be implemented as any of the controllers 120 and 122 as illustrated in FIG. 1A, while the access points 343, 344, 345, 346, 347, and 348 may be implemented as any of the access points 110, 111, 112, 113, and 114 as illustrated in FIG. 1A. At the first site 330, the access point 343 may be mapped to the controllers 331 and 332. Thus, data from the access point 343 may be tunneled to either of the controllers 331 or 332 depending on load balancing considerations, but a given data packet transmitted through the access point 343 may be tunneled to only one of the controllers 331 or 332, in a manner similar or same to that as described above with respect to FIG. 2. Likewise, tunnels may be established between each of the access points 344, 345, 346, 347, and 348, and the controllers 331 and 332.

Meanwhile, a network at the second site 350 may include controllers 351 and 352, along with access points 353, 354, 355, 356, 357, and 358. Any number of controllers and access points may be implemented at the second site 350, although, preferably, at least two controllers should be implemented at the second site 350 for redundancy purposes. The controllers 351 and 352 may be implemented as any of the controllers 120 and 122 as illustrated in FIG. 1A, while the access points 353, 354, 355, 356, 357, and 358 may be implemented as any of the access points 110, 111, 112, 113, and 114 as illustrated in FIG. 1A. At the second site 350, the access point 353 may be mapped to the controllers 351 and 352. Thus, data from the access point 353 may be tunneled to either of the controllers 351 or 352 depending on load balancing considerations, but a given data packet transmitted through the access point 353 may be tunneled to only one of the controllers 351 or 352, in a manner similar or same to that as described above with respect to FIG. 2. Likewise, tunnels may be established between each of the access points 344, 345, 346, 347, and 348, and the controllers 331 and 332.

Meanwhile, a network at the third site 370 may include controllers 371 and 372, along with access points 373, 374, 375, and 376. Any number of controllers and access points may be implemented at the third site 370, although, preferably, at least two controllers should be implemented at the third site 370 for redundancy purposes. The controllers 371 and 372 may be implemented as any of the controllers 120 and 122 as illustrated in FIG. 1A, while the access points 373, 374, 375, and 376 may be implemented as any of the access points 110, 111, 112, 113, and 114 as illustrated in FIG. 1A. At the third site 370, the access point 373 may be mapped to the controllers 371 and 372. Thus, data from the access point 373 may be tunneled to either of the controllers 371 or 372 depending on load balancing considerations, but a given data packet transmitted through the access point 373 may be tunneled to only one of the controllers 371 or 372, in a manner similar or same to that as described above with respect to FIG. 2. Likewise, tunnels may be established between each of the access points 373, 374, 375, and 376, and the controllers 371 and 372.

Meanwhile, a network at the fourth site 390 may include controllers 391 and 392, along with access points 393, 394, 395, and 396. Any number of controllers and access points may be implemented at the fourth site 390, although, preferably, at least two controllers should be implemented at the fourth site 390 for redundancy purposes. The controllers 391 and 392 may be implemented as any of the controllers 120 and 122 as illustrated in FIG. 1A, while the access points 393, 394, 395, and 396 may be implemented as any of the access points 110, 111, 112, 113, and 114 as illustrated in FIG. 1A. At the third site 390, the access point 393 may be mapped to the controllers 391 and 392. Thus, data from the access point 393 may be tunneled to either of the controllers 391 or 392 depending on load balancing considerations, but a given data packet transmitted through the access point 393 may be tunneled to only one of the controllers 391 or 392, in a manner similar or same to that as described above with respect to FIG. 2. Likewise, tunnels may be established between each of the access points 393, 394, 395, and 396, and the controllers 391 and 392.

An access point at a given site may be isolated from controllers at any other site. Therefore, the access point 343 may be isolated from the controllers 351, 352, 371, 372, 391 and 392, just to illustrate an example. Thus, the computing system 130 may provide versatility in deploying networks at different sites and common network configurations and/or IDs, as well as networks at different sites and different network configurations and/or IDs, while keeping networks at different sites and groups separated.

Figure 4:
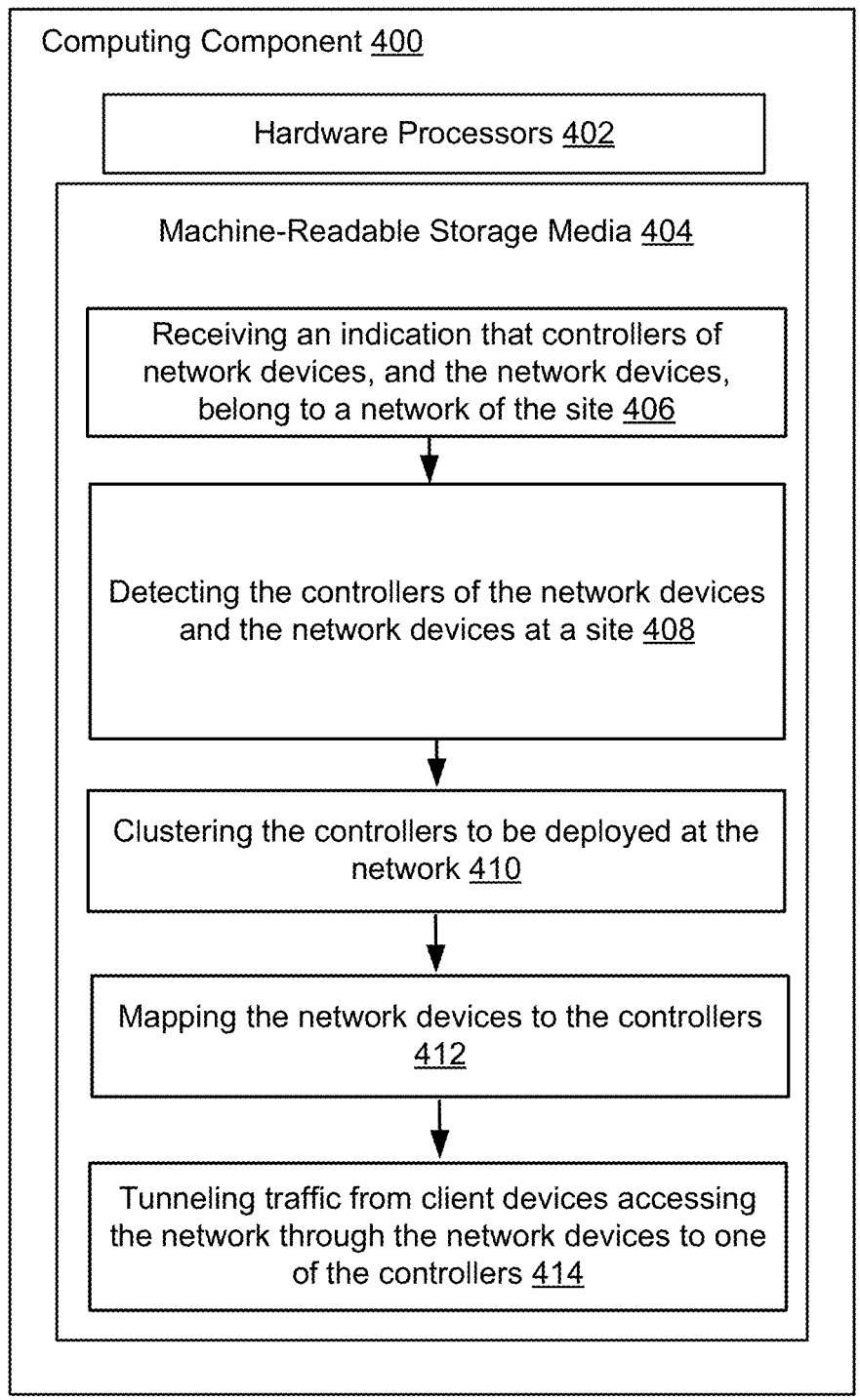
FIG. 4 is an exemplary flowchart, illustrating how controllers are clustered to be deployed at a network, network devices are mapped to networks, and traffic from client devices is tunneled from network devices to controllers, according to embodiments described in the present disclosure.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method of clustering controllers to be deployed at a network, mapping access points or switches to the network, and tunneling traffic from client devices at the access points or the switches to the controllers. It should be appreciated that there can be additional, fewer, or alternative steps performed in similar or alternative orders, or in parallel, within the scope of the various embodiments discussed herein unless otherwise stated. The computing component 400 may be implemented as the computing component 131 of FIGS. 1A and 1B. The machine-readable storage media 404 may include suitable machine-readable storage media described in FIG. 7.

At step 406, the hardware processor(s) 402 may execute machine-readable/machine-executable instructions stored in the machine-readable storage media 404 to receiving an indication that controllers of access points or switches, and the access points or the switches, belong to a network of the site. Next, at step 408, the hardware processor(s) 402 may detect the controllers of the access points or the switches and of the access points or the switches at a site. Next, at step 410, the hardware processor(s) 402 may automatically cluster the controllers to be deployed at the network. Next, at step 412, the hardware processor(s) 402 may automatically map the access points or the switches to the controllers. Next, at step 414, the hardware processor(s) 402 may automatically tunnel traffic from client devices accessing the network through the access points or the switches to one of the controllers.

Figure 5:
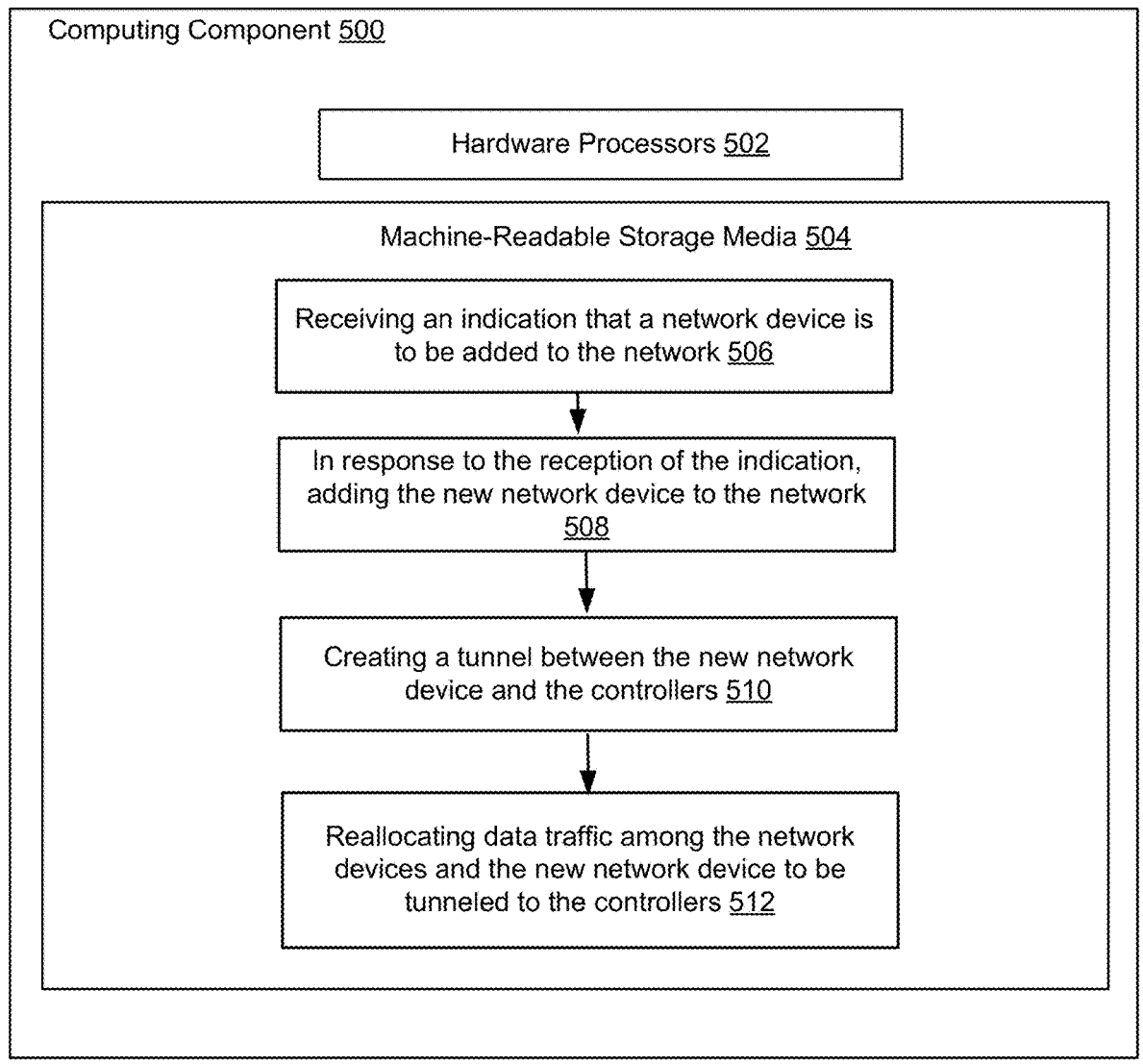
FIG. 5 is an exemplary flowchart, illustrating how a new network device is added and incorporated into a network, according to embodiments described in the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of adding a new access point and incorporating that new access point into a network. It should be appreciated that there can be additional, fewer, or alternative steps performed in similar or alternative orders, or in parallel, within the scope of the various embodiments discussed herein unless otherwise stated. The computing component 500 may be implemented as the computing component 131 of FIGS. 1A and 1B. The machine-readable storage media 504 may include suitable machine-readable storage media described in FIG. 7. The methods. The steps or decisions of FIG. 5 provide an extension of steps 406, 408, 410, 412, and 414 from FIG. 4.

At step 506, the hardware processor(s) 502 may execute machine-readable/machine-executable instructions stored in the machine-readable storage media 504 to receive an indication that a new access point or a new switch is to be added to the network. At step 508, in response to the reception of the indication, the hardware processor(s) 502 may automatically add the new access point or the new switch to the network. At step 510, the hardware processor(s) 502 may create a tunnel between the new access point or the new switch and the controllers. At step 512, the hardware processor(s) 502 may reallocate data traffic among the access points or the switches and the new access point or the new switch to be tunneled to the controllers.

Figure 6:
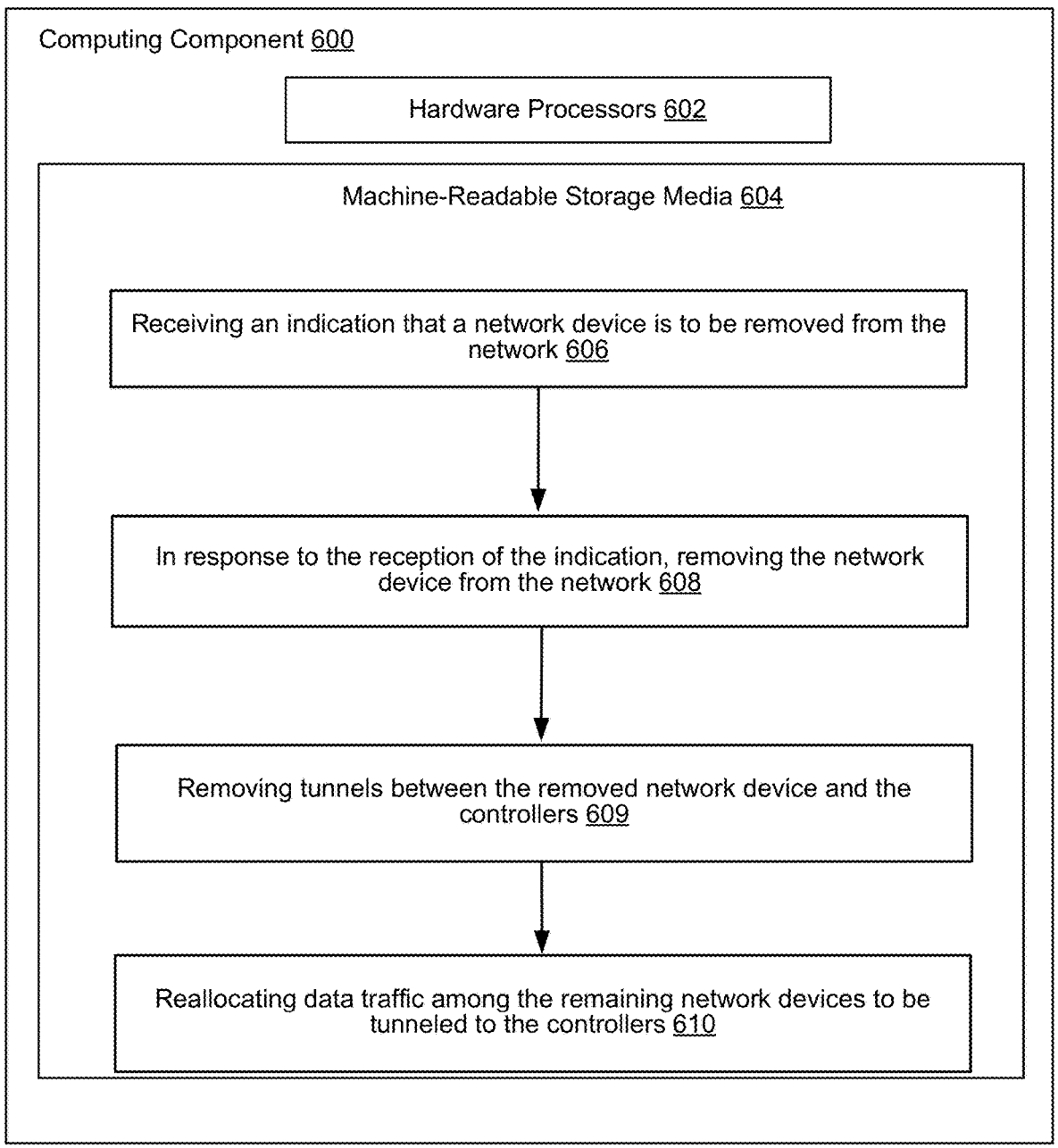
FIG. 6 is an exemplary flowchart, illustrating how a network device is removed from a network, according to embodiments described in the present disclosure.

FIG. 6 illustrates a computing component 600 that includes one or more hardware processors 602 and machine-readable storage media 604 storing a set of machine-readable/machine-executable instructions that, when executed, cause the hardware processor(s) 602 to perform an illustrative method of removing an access point or a switch from a network. It should be appreciated that there can be additional, fewer, or alternative steps performed in similar or alternative orders, or in parallel, within the scope of the various embodiments discussed herein unless otherwise stated. The computing component 600 may be implemented as the computing component 131 of FIGS. 1A and 1B. The machine-readable storage media 604 may include suitable machine-readable storage media described in FIG. 7. The methods. The steps or decisions of FIG. 6 provide an extension of steps 406, 408, 410, 412, and 414 from FIG. 4.

At step 606, the hardware processor(s) 602 may execute machine-readable/machine-executable instructions stored in the machine-readable storage media 604 to receive an indication that an access point or a switch is to be removed from the network. At step 608, In response to the reception of the indication, the hardware processor(s) 502 may remove the access point or the switch from the network. At step 609, the hardware processor(s) 602 may remove the tunnels between the removed access point or the removed switch and the controllers. At step 610, the hardware processor(s) 502 may reallocate data traffic among the remaining second access points or second switches to be tunneled to the second controllers.

Figure 7:
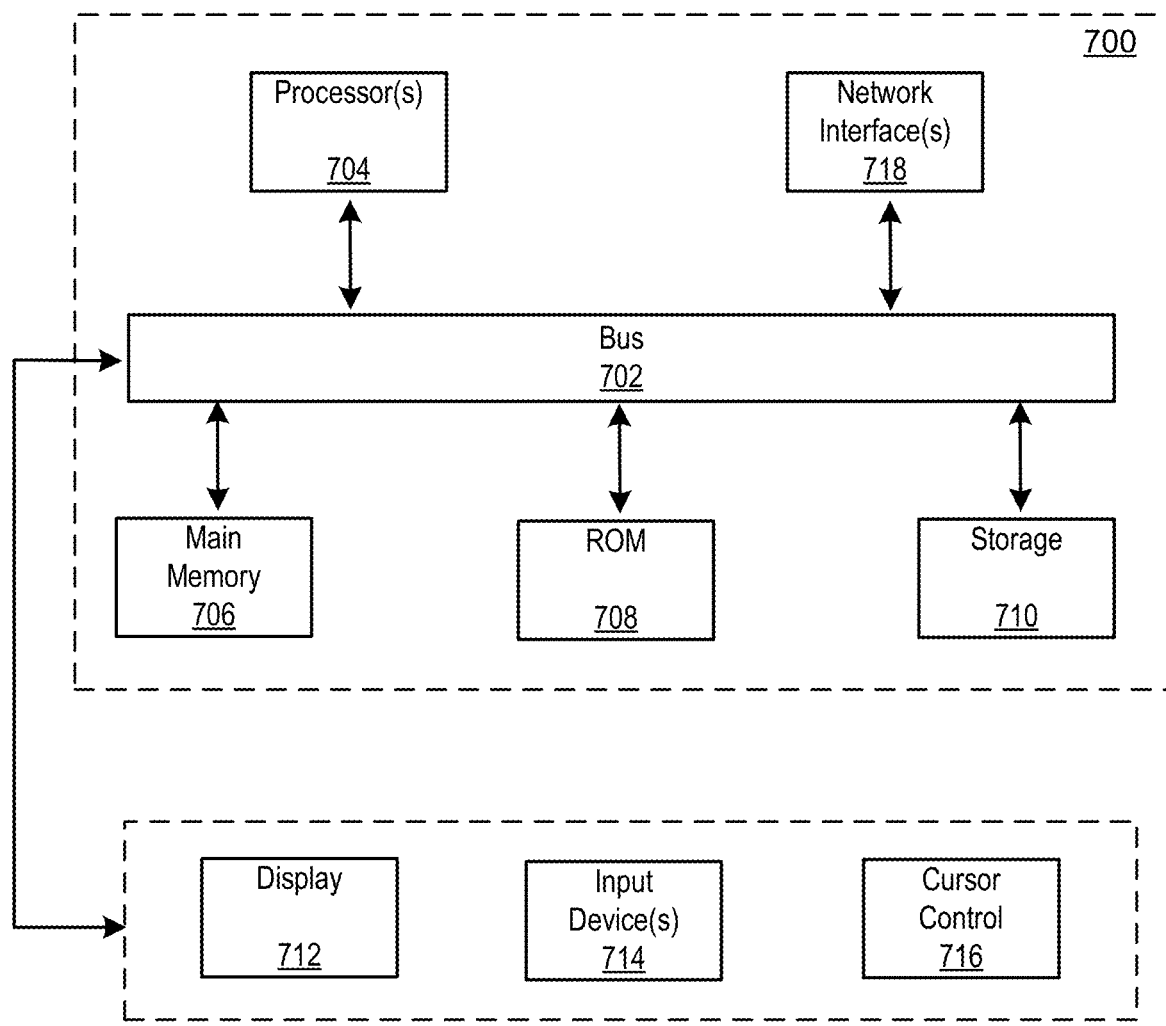
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "engine," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
receiving an indication that controllers and network devices belong to a site of a network;
detecting the controllers and the network devices at the site;
clustering the controllers to be deployed in the network;
automatically mapping, to the controllers and to the network devices, a SSID (Service Set Identifier) or a MAC (Media Access Control) address of the network;
tunneling traffic from client devices accessing the network through the network devices to one of the controllers;
receiving an indication that a network device is to be removed from the network; and
in response to the reception of the indication:
removing the network device from the network;
removing one or more tunnels between the removed network device and the controllers; and
reallocating traffic among one or more remaining network devices to be tunneled to the controllers.

2. The computer implemented method of claim 1, wherein the tunneling of the traffic comprises:
creating a tunnel between each of the network devices to each of the controllers such that the traffic is transmittable to any of the controllers; and
selectively tunneling the traffic to one of the controllers based on loads of each of the controllers.

3. The computer implemented method of claim 1, wherein the tunneling of the traffic comprises creating a tunnel that provides L2 traffic encapsulation to transmit multicast, broadcast, or non-IP data packets or creating an IPSec tunnel to transmit unicast data packets.

4. The computer implemented method of claim 1, further comprising:
receiving an indication that a new network device is to be added to the network;
in response to the reception of the indication, adding the new access point or the new switch to the network; and
creating a tunnel between the new network device and each of the controllers.

5. The computer implemented method of claim 1, further comprising:
   receiving an indication that second controllers and second network devices belong to a second network;
   detecting the second controllers and the second network devices;
   mapping the second network devices to the second controllers; and
   tunneling traffic from second client devices accessing the second network through the second network devices to one of the second controllers.

6. The computer implemented method of claim 5, further comprising isolating the second network devices from the controllers and isolating the network devices from the second controllers.

7. The computer implemented method of claim 1, wherein the network comprises a LAN, WAN, or a WLAN.

8. The computer implemented method of claim 1, wherein the computer-implemented method is performed by a server separate from the network.

9. A computing system comprising:
   one or more processors; and
   a memory storing instructions that, when executed by the one or more processors, causes the one or more processors to:
      receive an indication that controllers and network devices belong to a site of a network;
      detect the controllers and the network devices at the site;
      cluster the controllers to be deployed in the network;
      automatically map, to the controllers and to the network devices, a SSID (Service Set Identifier) or a MAC (Media Access Control) address of the network;
      tunnel traffic from client devices accessing the network through the network devices to one of the controllers;
      receive an indication that a network device is to be removed from the network; and
      in response to the reception of the indication:
         remove the network device from the network;
         remove one or more tunnels between the removed network device and the controllers; and
         reallocate traffic among one or more remaining network devices to be tunneled to the controllers.

10. The computing system of claim 9, wherein the tunneling of the traffic comprises:
    creating a tunnel between each of the network devices to each of the controllers such that the traffic is transmittable to any of the controllers; and
    selectively tunneling the traffic to one of the controllers based on loads of each of the controllers.

11. The computing system of claim 9, wherein the tunneling of the traffic comprises creating a tunnel that provides L2 traffic encapsulation to transmit multicast, broadcast, or non-IP data packets or creating an IPSec tunnel to transmit unicast data packets.

12. The computing system of claim 9, wherein the instructions further cause the one or more processors to:
    receive an indication that a new network device is to be added to the network;
    in response to the reception of the indication, automatically add the new network device to the network; and
    create a tunnel between the new network device and each of the controllers.

13. The computing system of claim 9, wherein the instructions further cause the one or more processors to:
    receive an indication that a new controller is to be added to the network;
    in response to the reception of the indication, add the new controller to the network; and
    create a tunnel between the new controller and the network devices.

14. The computing system of claim 9, wherein the instructions further cause the one or more processors to:
    receive an indication that second controllers, and the second network devices belong to the second network;
    detect the second controllers and the second network devices;
    map the second network devices to the second controllers; and
    tunnel traffic from second client devices accessing the second network through the second network devices to one of the second controllers.

15. The computing system of claim 9, wherein the network comprises a LAN, WAN, or a WLAN.

16. The computing system of claim 9, wherein the one or more processors comprises a server separate from the network and from the second network.

* * * * *